US008721239B2

(12) United States Patent
Davis et al.

(10) Patent No.: US 8,721,239 B2
(45) Date of Patent: May 13, 2014

(54) BOAT LATCH

(75) Inventors: Geoffrey Calton Davis, Hindmarsh Valley (AU); Brian Donald Codd, Hindmarsh Valley (AU)

(73) Assignee: Geoffrey Calton Davis (AU)

( * ) Notice: Subject to any disclaimer, the term of this patent is extended or adjusted under 35 U.S.C. 154(b) by 970 days.

(21) Appl. No.: 11/574,320

(22) PCT Filed: Aug. 26, 2005

(86) PCT No.: PCT/AU2005/001281
§ 371 (c)(1),
(2), (4) Date: Apr. 22, 2008

(87) PCT Pub. No.: WO2006/021043
PCT Pub. Date: Mar. 2, 2006

(65) Prior Publication Data
US 2008/0265543 A1    Oct. 30, 2008

(30) Foreign Application Priority Data

Aug. 27, 2004   (AU) ............................... 2004904877

(51) Int. Cl.
*B60P 7/08* (2006.01)
(52) U.S. Cl.
USPC ...................... 410/77; 410/2; 410/69; 410/80

(58) Field of Classification Search
CPC ........ B60P 7/0807; B60P 7/08; B60P 3/1075; B60P 3/1033; B62D 63/062; B62D 63/068; B60R 2011/0071; B63C 3/10; E05B 15/04
USPC ......... 410/2, 3, 7, 69, 77, 80, 81; 292/341.15, 292/341.17; 280/414.1, 508; 114/344
See application file for complete search history.

(56) References Cited

U.S. PATENT DOCUMENTS

| 4,463,965 | A | 8/1984 | Lawson |
| 4,623,161 | A | 11/1986 | Sprague |
| 4,641,851 | A | 2/1987 | Knies |
| 5,263,733 | A | 11/1993 | Kastenberger et al. |
| 5,683,214 | A | 11/1997 | Jeffreys |
| 5,895,185 | A | 4/1999 | Spence |
| 7,344,344 | B2 * | 3/2008 | Davis .............................. 410/77 |

FOREIGN PATENT DOCUMENTS

| AU | 2002100481 | 11/2002 |
| AU | 2002300834 | 6/2003 |

* cited by examiner

*Primary Examiner* — Stephen Gordon
(74) *Attorney, Agent, or Firm* — Brooks Kushman P.C.

(57) ABSTRACT

The invention relates to an apparatus for assisting the loading and unloading of a boat in relation to a boat trailer, including a snare at or toward a front of the boat, and a latch on the boat trailer which is adapted to adopt at least one of two positions, a first of which allows for a releasable engagement of the snare by the latch, and a second of which allows for a release from such engagement, and a lever to move the latch between the two positions.

13 Claims, 7 Drawing Sheets

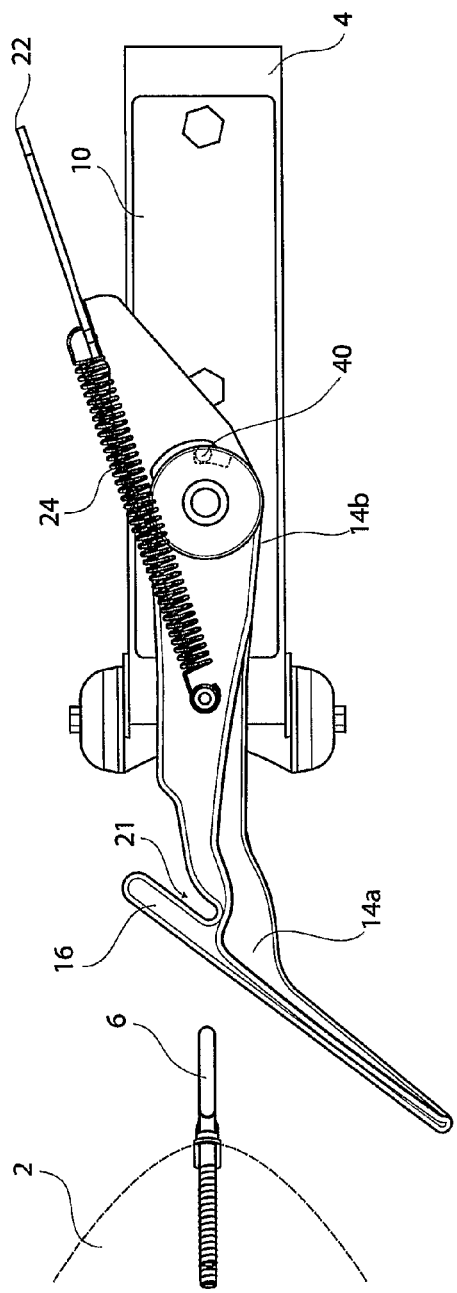
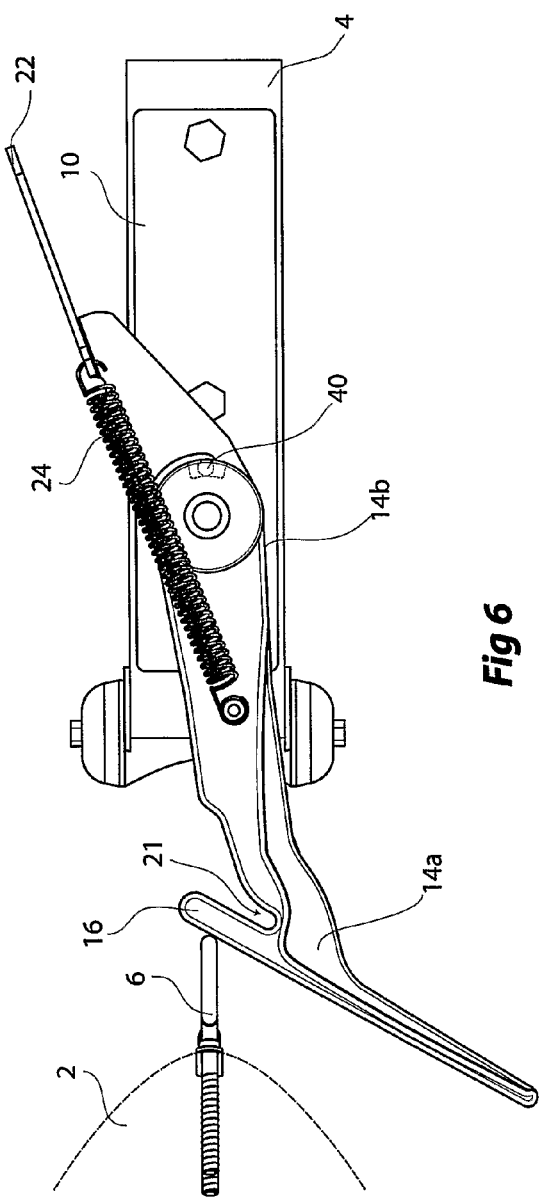
Fig 5
Fig 6

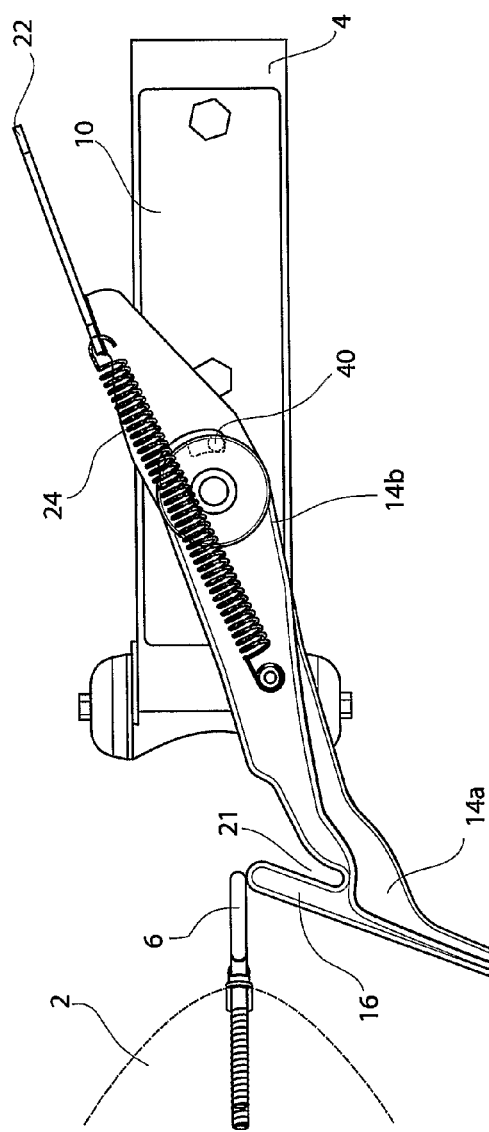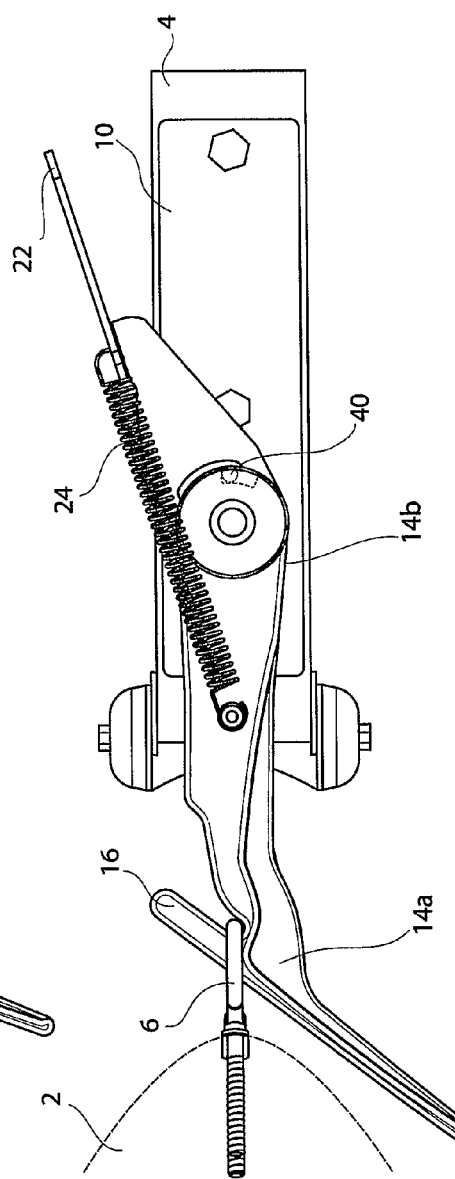

BOAT LATCH

TECHNICAL FIELD

This invention relates to a means and method for assisting the loading and unloading of a boat in relation to a boat trailer.

BACKGROUND ART

When loading a boat onto a trailer one person is normally needed to connect a winch line to the bow of the boat and operate a winch, while another person is required to remain in the boat and maintain its alignment.

There can be times when the circumstances are such that it can be very difficult indeed to effect a one person loading without potentially damaging the boat and/or the trailer. It is an object of the present invention therefore to reduce the difficulties being experienced.

What I have realized is that if one separates the functions of a first interconnect between boat and trailer from a longer, trailer able interconnect status of the retention between the boat and the trailer, then there can be significant advantage.

Other objects and advantages of the present invention will become apparent from the following description, taken in connection with the accompanying drawings, wherein, by way of illustration and example, an embodiment of the present invention is disclosed.

DISCLOSURE OF THE INVENTION

In one form of this invention although this may not necessarily be the only or indeed the broadest form of this there is proposed an arrangement whereby there is provided between a boat and a boat trailer, a first snare position which is able to be effected by a releasable interlock by an engagement device, and means to then further draw a boat onto a trailer from this first, releasable interlock position.

What we have therefore is an arrangement in which there can be a first interconnect which can have a significant extent of tolerance with respect to the relative positions of the boat and trailer. It is very useful indeed to restrain the boat sufficiently so that the boat can be left while an operator winches the boat into a tight and safe permanent storage position on the trailer, ready for transport of the boat on the trailer.

In a further form, the invention may be said to lie in an apparatus for assisting the loading and unloading of a boat in relation to a boat trailer, the apparatus including a snare at or toward a front of the boat, a latch on the boat trailer which is adapted to adopt at least one of two positions, a first of which allows for a releasable engagement of the snare by the latch, and a second of which allows for a release from such engagement, and a means to move the latch between the two positions, wherein the latch is adapted to permit the snare and boat to be drawn from their releasable engagement with the latch, to a position adapted to facilitate transportation of the boat upon the trailer.

Preferably, the means for drawing the snare and boat from their releasable engagement with the latch, is a winch.

Preferably, when the latch is in the first position, it is adapted to automatically engage the snare when the boat is driven or drawn onto the trailer.

Preferably, the means to move the latch between the two positions is a lever.

Preferably, the latch includes a body, a hook portion and the lever, wherein the hook portion and the lever are both pivotally connected to the body.

Preferably, the hook is biased toward the lever by resilient biasing means.

Preferably, when the latch is in the first position, the lever extends to a first side of the body, and the latch can be set to the second position by rotating the lever around to the other side of the body.

Preferably, when the hook is in either of the first or second positions, the two ends of the resilient biasing means are on the same side of the point at which the hook pivotally connects to the body.

Preferably, the hook has a neck with a first end, and a second end distal from the first end, and a head at the second end, wherein the head extends on either side of the neck.

Preferably, neck of the hook is pivotally attached to the body at its first end, and is the head is angled relative to the neck.

Preferably, the latch is in the first capture position, the body of the latch and the neck of the hook are substantially collinear.

Preferably, the head has a forward edge and a rear edge, wherein the forward edge subtends an acute angle relative to the neck of the hook shaped portion.

Preferably, the forward edge of the hook is the initial contact surface between the snare and the latch.

Preferably, the lever has a first end, and a second distal end, the lever being pivotally attached to the body of the latch at its first end.

Preferably, the biasing means is a helical spring having a first end, and a second distal end, wherein the first end is attached to the neck of the hook, and the second end is attached to a point on the lever that is spaced apart form the point at which the lever pivotally connects to the body of the latch.

Preferably, the lever is pivotally attached to the body at the same point that the hook portion pivotally attaches to the body.

In a further form, the invention may be said to lie a method of assisting the loading of a boat in relation to a boat trailer using the apparatus described, including the steps of setting the latch to the first position using the latch movement means, reversing the trailer into the water to a sufficient depth that the boat can be driven onto the trailer, and driving the boat onto the trailer until the latch releasably engages the snare on the boat.

Preferably, there is the further step of winching the boat from this position, into a more secure position in which the boat can be transported on the trailer.

In a further form, the invention may be said to lie in a method of assisting the unloading of a boat in relation to a boat trailer using the apparatus described, including the steps of setting the latch to the first position using the latch movement means, reversing the trailer into the water to a sufficient depth that the boat can be launched from the trailer, winching the boat from the position in which the boat was transported until the latch and snare engage, using the latch movement means to move the latch from said first position to the second position, and driving or drawing the boat forward slightly, thereby releasing the snare from engagement with the latch.

BRIEF DESCRIPTION OF THE DRAWINGS

For a better understanding of this invention, it will now be described with relation to a preferred embodiment, which shall be described with the assistance of drawings, wherein;

FIGS. 5 to 9 are plan views of the apparatus in FIG. 1, showing it in use during both retrieving (loading) and launching (unloading) operations.

Referring now to FIG. 1, there is an arrangement for assisting the loading and unloading of a boat 2 in relation to a boat trailer 4, the device including a substantially loop shaped snare 6 attached to the bow of the boat 2, and a latch 8 bolted to the winch post of the trailer 4.

Referring to FIG. 4, it can be seen that the snare itself has a first part 6a adapted to attach to the bow of the boat, and a second loop shaped portion 6b. This embodiment of the snare is adapted for fitment to a fibreglass boat, and the first part includes a pair of substantially parallel threaded shafts, a first of which 7a is welded to the loop shaped portion 6b, and the second of which 7b is connected to it by an eyelet 9 that runs on a portion of the loop. Each of the two threaded shafts 7a and 7b is adapted to pass through a corresponding hole in the bow of the boat 2, so that they can then be secured to the boat by nuts on the inside of the hull.

Figure 1:
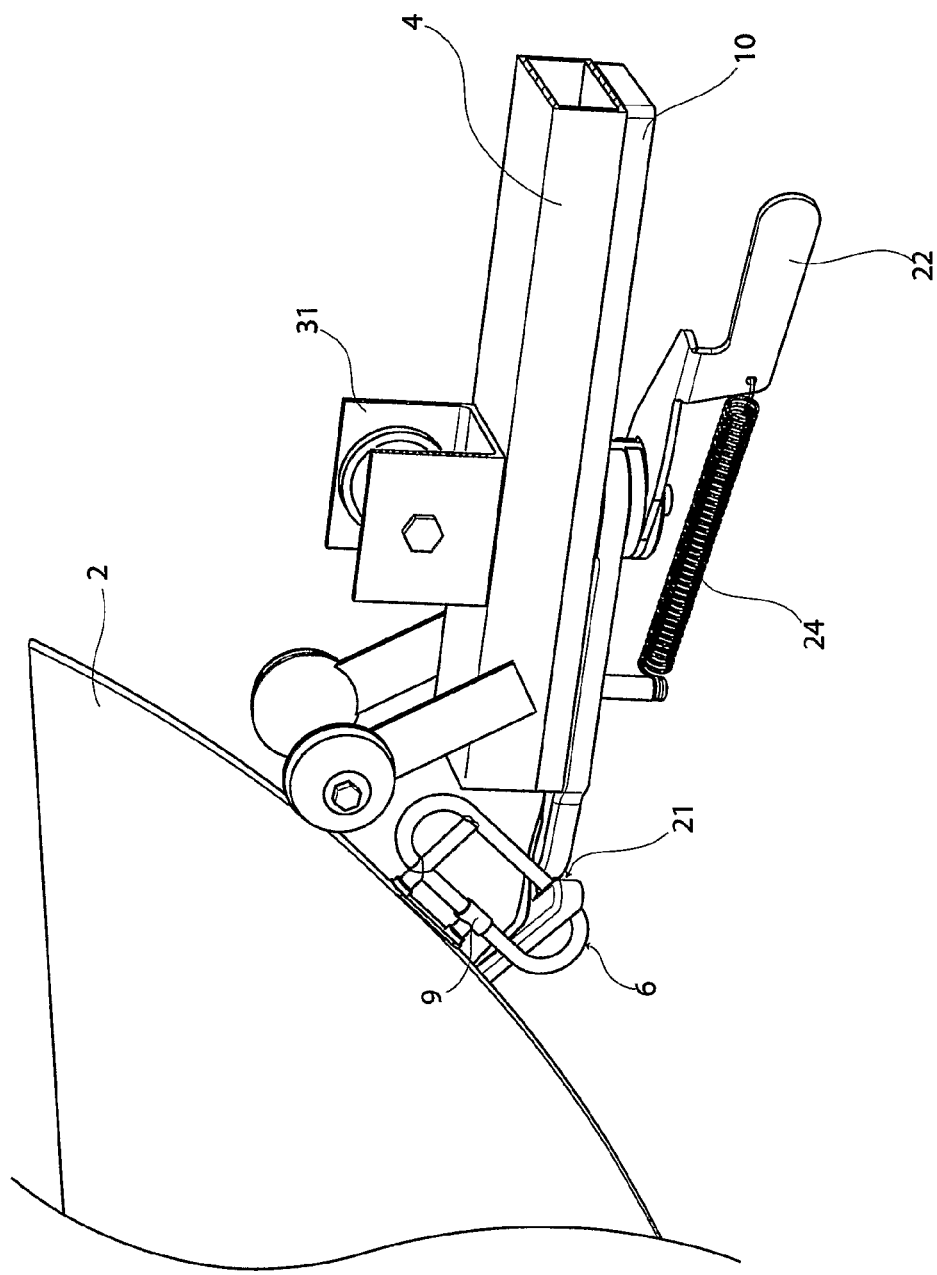
FIG. 1 is a perspective view of the apparatus, showing the snare at the front of a boat, and the latch attached to a trailer, where the latch and snare are releasably engaged.

The advantage of mounting the snare 6 in this fashion is that it utilises the boats existing structural hard point, which is designed by the original manufacture of the boat to act as the winch point for the vessel.

The distance between the two holes in the hull may vary from boat to boat. It is for this reason that the second threaded shaft 7b is connected to the loop 6b via an eyelet 9, so that the distance between the two shafts 7a and 7b can be adjusted to suit the boat 2.

A further embodiment of the snare (not illustrated), is adapted for fitment to aluminium boats, and it comprises a U-shaped loop that is adapted to bolt to the boat hull.

Figure 2:
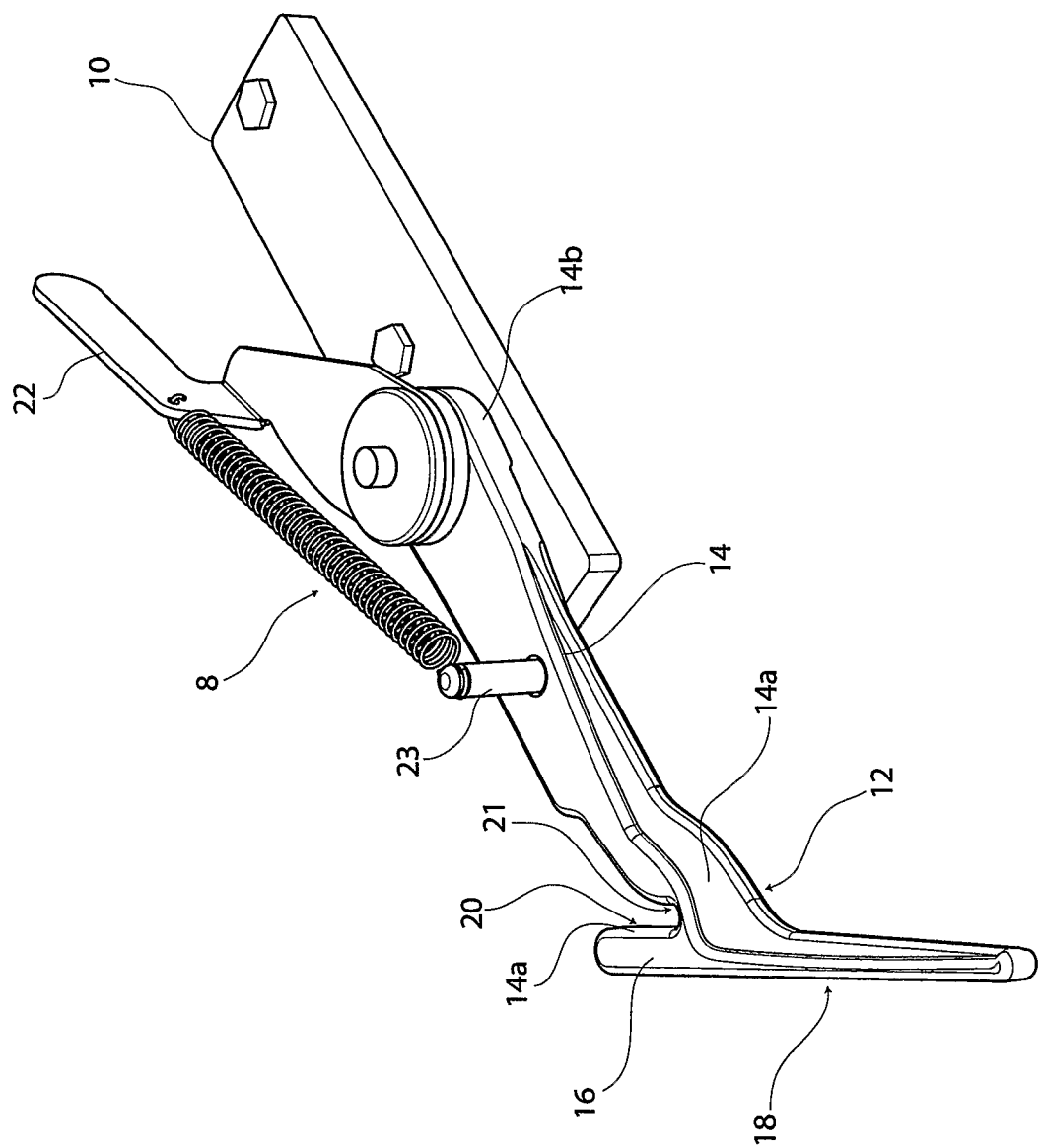
FIG. 2 is a perspective view of the latch in FIG. 1.

Referring now to FIG. 2, the latch 8 includes a body 10 bolted to the trailer 4, and a hook 12 pivotally attached to the body 10. The body 10 is cut from steel plate, and the hook 12 is a steel casting.

The hook 12 has a neck 14 with a first end 14a, a second distal end 14b, and a head 16 at the first end. The head 16 extends outwardly on either side of the neck 14 at the first end 14a, and the second end 14b of the neck 14 is the end pivotally attached to the body 10.

The head has a forward edge 18 and a rear edge 20; the forward edge subtends an acute angle relative to the neck 14 of the hook. As can be seen in FIG. 6, this forward edge 18 of the hook 12 is the initial contact surface between the snare 6 and the latch 8, and it allows the snare 6 to displace the hook portion 14 of the latch 8 when the snare 6 is driven toward the latch 8.

There is a notch 21 in the neck 12 of hook portion 8 that is adapted to nest a portion of the snare loop 6b.

There is a lever 22 pivotally attached to the body 10 of the latch 8 at the same point that the hook 12 attaches to the body. The lever 22 can be rotated rearwardly from one side of the body 10 to the other, in doing so it effects a change in the position of the hook 14.

There is a helical spring 24 having a first end attached to the neck 14 of the hook 8 by a pin 23, and a second end attached to a point 26 on the lever that is spaced apart form the point at which the lever 22 pivotally connects to the body 10 of the latch 8.

Referring now to FIG. 5, it can be seen that when the lever 22 is in the capture position, the notch 21 in the neck 12 of the hook portion 8 is substantially aligned with the centreline of the body 10.

Figure 9:
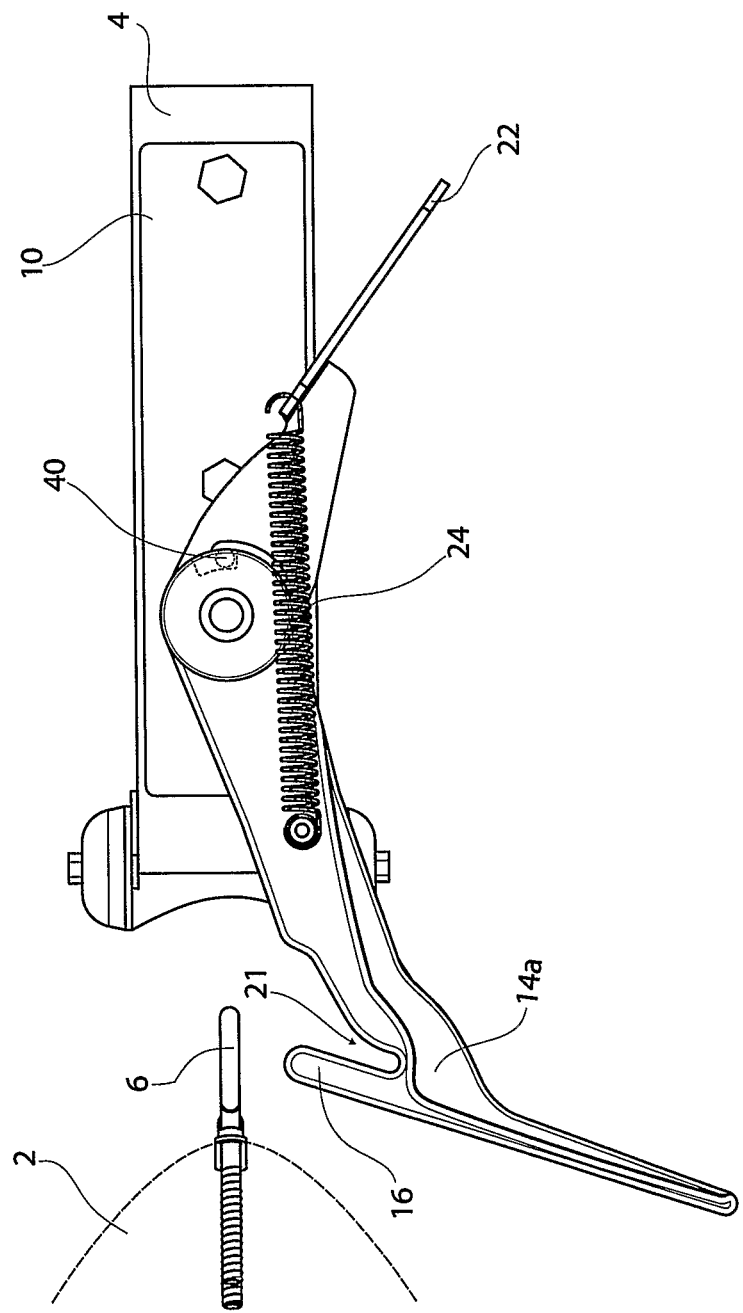

When the lever 22 is rotated rearwardly around its axis of rotation so that it is on the other side of the body 10, as seen in FIG. 9, it is in the release position. In the release position, the notch 21 is offset from the centreline of the body 10.

When the hook 12 is in either of the capture or release positions, the two ends of the spring 24 are both always on the same side of the pivot point of the lever 22 as each other. This creates an over centre geometry.

Figure 3:
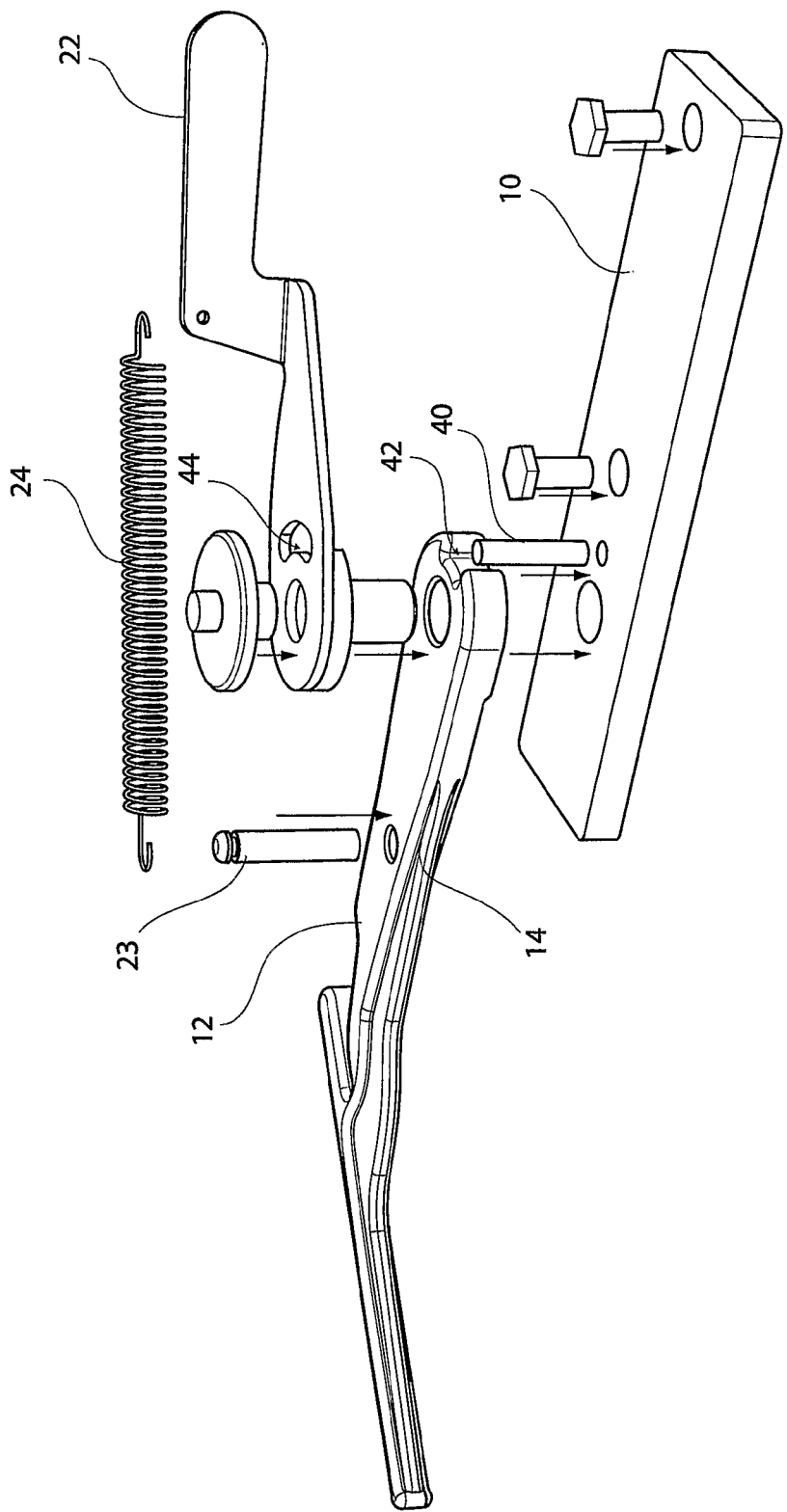
FIG. 3 is an exploded perspective view of the latch in FIG. 1.
Figure 4:
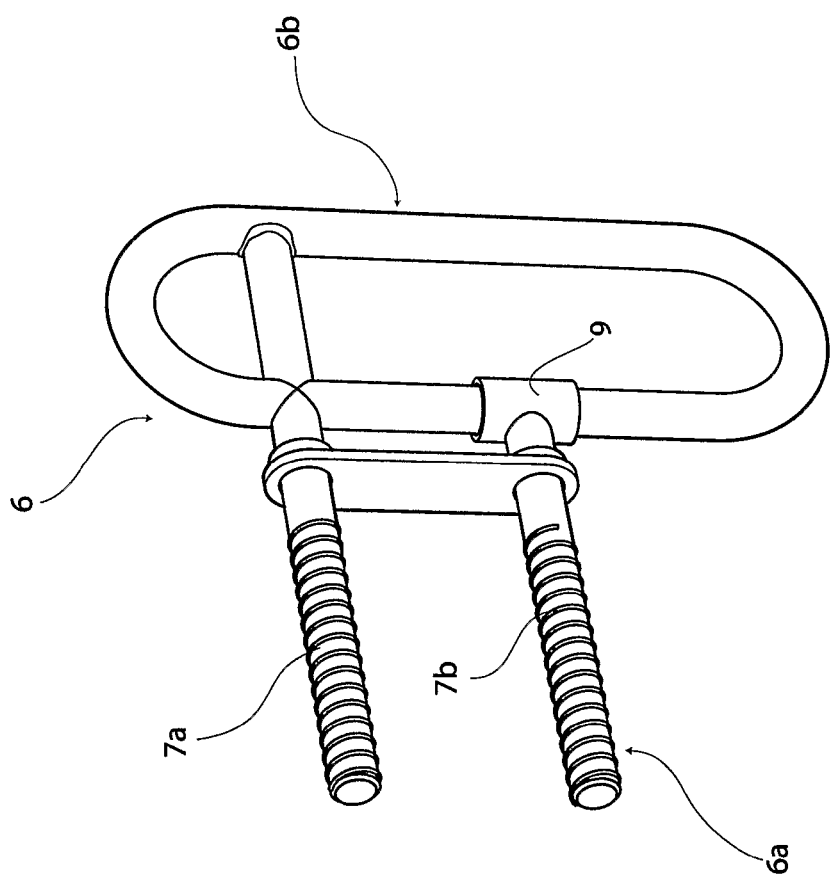
FIG. 4 is a detailed perspective view of the snare in FIG. 1.

Both the hook 12 and the lever 22 are limited in the extent that they can travel to one side of the body 10 or the other, by a pin 40 engaging the body 10 of the latch 8. Both the hook 12 and the lever 22 incorporate an arcuate slot of finite length 42 and 44 respectively, and the pin 40 runs in both of these slots 42 and 44 simultaneously when assembled. The pin and the slots are most visible in the exploded assembly illustrated in FIG. 3.

When launching a boat 2 from the trailer 4 i.e. unloading it, the boat starts in a trailerable position (not illustrated), this being one that is suited for transportation of the boat upon the trailer, and where the boat is retained on the trailer by the winch and chains etc. The boat 2 and trailer 4 are reversed into the water to the required depth for launching.

The lever 22 is set to the capture position, and the winch 31 is eased off so that the boat 2 can move back and be releasably engaged with and captured by the notch 20 in the latch 8, as illustrated in FIG. 8. The winch hook is then removed from the boat, so that the boat 2 is being retained on the trailer 4 by virtue of the engagement between the snare 6 and the latch 8 only.

Referring now to FIG. 9, the latch 8 is then set to the boat releasing (unloading) position by rotating the lever 22 rearwardly and around to the other side of the latch body 10. With the boat engine running, the operator can release the boat from the latch by easing the boat forward under slight power. When the operator does this, the loop of the snare is driven out of the notch 21, and then forward along the angled side of the neck 14a, which deflects the neck of the latch away from and out of the snare 6.

Referring now to FIG. 5, when retrieving (loading) the boat, the lever 22 is set to the capture position, and the trailer 4 is reversed into the water to the required depth. The boat is then driven onto the trailer until the bow is approximately one meter from the latch 8. At this point the boat should be stopped and allowed to settle before proceeding further. The operator should then gradually increase power and ease the boat 2 forward until the loop 6b of the snare 6 comes into contact with the forward edge 18 of the hooks head, as illustrated in FIG. 6. With continued forward throttle applied, the snare 6 will begin to displace the hook portion 12 from the capture position against the resistance of the spring 24, this displacement will continue until the hook 12 has reached the displaced position illustrated in FIG. 7. Once the hook has reached the displaced position, the snare 6 will pass it and the hook 12 will be free to return to the captured position illustrated in FIG. 8 under the effect of the spring 24, and the hook will have captured the snare thereby releasably engaging the boat 2 and the trailer 4. The boat is now in the first interlock position. The boat is maintained in this state of releasable engagement under its own weight.

The winch 31 cable should then be reattached to the boat via the loop 6a of the snare 6, and the boat winched forward slightly using the winch 31, so that the snare 6 is not depending on the latch 8. The safety chains and straps should then be attached so as to ensure proper attachment of the boat 2 to the trailer 4 prior to towing the boat away from the ramp. The boat is now in the storage position, in this position it is safe to transport the boat on the trailer, and so the trailer 4 can now be towed forward until clear of the water.

When viewing the hook 12 of the latch 8 in plan form, it can be seen that it is shaped such that the snare 6 can be winched out of the notch 21 without clearing the head 16 of the hook. This means that if the winch cable broke during winching the snare 6 would again be caught by the hook 12, and that it would slide back into the notch 21 where it is securely, but releasably retained.

In a further form, the invention can be adapted for fitment to aluminium boats. Some aluminium boats are not fitted with a u-bolt, instead they have a bracket secured to the bow. In these instances, the snare can be adapted for secure, releasable attachment to this bracket.

It is considered that the means and method for assisting the loading and unloading of a boat in relation to a boat trailer according to the present invention, will be of particular use to those people wishing to launch and retrieve a boat on their own.

Although the invention has been herein shown and described in what is conceived to be the most practical and preferred embodiment, it is recognised that departures can be made within the scope of the invention, which is not to be limited to the details described herein but is to be accorded the full scope of the appended claims so as to embrace any and all equivalent devices and apparatus.

The invention claimed is:

1. An apparatus for assisting the loading and unloading of a boat in relation to a boat trailer, the apparatus comprising:
   a snare at or toward a front of the boat, the snare having a pair of shafts defining a distance therebetween, at least one of the shafts adjustable relative to the other shaft to alter the distance between the shafts such that the snare can secure to a variety of boats;
   a latch on the boat trailer which is adapted to adopt at least one of two positions including a first position allowing for a releasable engagement of the snare of the boat by the latch, and a second position allowing for a release of the snare, the latch comprising a neck and a hook portion angled relative to the neck, the hook portion having a forward edge surface and a notch for receiving the snare; and
   a spring that biases the latch in a first rotational direction when the latch is in the first position and biases the latch in a second rotational direction opposite from the first direction when the latch is in the second position; and
   a lever connected to the spring and shiftably mounted on the boat trailer between a first and second position for altering the bias of the spring between the first and second rotational directions;
   wherein sliding of the snare along the forward edge surface causes rotation of the latch such that the notch engages the snare, and wherein rotation of the lever enables the snare to be disengaged from the notch such that the snare can slide along the forward edge surface and away from the latch.

2. The apparatus as in claim 1, further wherein when the latch is in the first position, it is adapted to automatically engage the snare when the boat is driven or drawn onto the trailer.

3. The apparatus as in claim 1, wherein when the latch is in the first position, the lever extends to a first side of a body of the latch, and the latch can be set to the second position by rotating the lever around to a second side of the body.

4. The apparatus as in claim 1, wherein when the hook portion alters between the first and second positions, the spring alters from being on one side of a point at which the hook portion pivotally connects to a body of the latch to another side of the point.

5. The apparatus as claim 1, wherein the hook portion has the neck with a first end, and a second end distal from the first end, and a head at the second end, wherein the head extends on either side of the neck, and wherein the latch has a body.

6. The apparatus as in claim 5, wherein the neck of the hook portion is pivotally attached to the body at its first end, and the head is angled relative to the neck.

7. The apparatus as in claim 5, wherein when the latch is in the first position, the body of the latch and the neck of the hook portion are substantially collinear.

8. The apparatus as in claim 1, wherein the forward edge surface of the hook portion is an initial contact surface between the snare and the latch when the boat is being loaded onto the boat trailer.

9. The apparatus as in claim 1, wherein the lever has a first end, and a second distal end, the lever being pivotally attached to a body of the latch at its first end.

10. The apparatus as in claim 1, wherein the spring is a helical spring having a first end, and a second distal end, wherein the first end is attached to a neck of the hook portion, and the second end is attached to a point on the lever that is spaced apart from a point at which the lever is pivotally connected to a body of the latch.

11. The apparatus as in claim 1, wherein the lever is pivotally attached to a body of the latch at a point at which the hook portion pivotally attaches to the body.

12. A method of assisting the loading of the boat in relation to the boat trailer using the apparatus described in claim 1, including steps of setting the latch to the first position using the lever, reversing the trailer into water to a sufficient depth that the boat can be driven onto the trailer, and driving the boat onto the trailer until the latch releasably engages the snare on the boat.

13. A method of assisting the unloading of the boat in relation to the boat trailer using the apparatus described in claim 1, including steps of setting the latch to the first position using the lever, reversing the trailer into water to a sufficient depth that the boat can be launched from the trailer, winching the boat from a position in which the boat was transported until the latch and snare engage, and using the lever to move the latch from said first position to the second position, and driving or drawing the boat forward slightly, thereby releasing the snare from engagement with the latch.

* * * * *